United States Patent [19]

Arai et al.

[11] Patent Number: 4,908,393
[45] Date of Patent: Mar. 13, 1990

[54] PROPYLENE RESIN FOAMED PARTICLES AND FOAMED MOLD ARTICLE

[75] Inventors: Masakazu Arai; Hiroshi Endo; Toshihiro Gotoh; Toshio Yagi; Masanori Tanaka; Masanori Saito; Shigeki Mathuno, all of Mie, Japan

[73] Assignee: Mitsubishi Yuka Badische Co., Ltd., Yokkaichi, Japan

[21] Appl. No.: 321,217

[22] Filed: Mar. 9, 1989

[30] Foreign Application Priority Data

Mar. 24, 1988 [JP] Japan ................................. 63-70186
Dec. 9, 1988 [JP] Japan ................................. 63-311685

[51] Int. Cl.$^4$ ............................................... C08J 9/18
[52] U.S. Cl. ........................................ 521/60; 428/71; 428/402; 521/56; 521/59
[58] Field of Search ................ 428/402, 71; 521/56, 521/60, 59

[56] References Cited

U.S. PATENT DOCUMENTS

| Re. 32,780 | 11/1988 | Yoshimura et al. | 521/58 |
| 4,108,934 | 8/1978 | Rubens et al. | 521/56 |
| 4,186,068 | 1/1980 | Rubens | 521/50.5 |
| 4,504,534 | 3/1985 | Adachi et al. | 521/60 |
| 4,600,636 | 7/1986 | Yoshimura et al. | 521/58 |
| 4,626,555 | 12/1986 | Endo et al. | 521/60 |
| 4,645,249 | 2/1987 | Nagoshi et al. | 521/60 |
| 4,657,937 | 4/1987 | Kuwabarga et al. | 521/60 |
| 4,689,351 | 8/1987 | Endo et al. | 521/60 |
| 4,748,191 | 5/1988 | Nakamura | 521/60 |
| 4,810,440 | 3/1989 | Yoshida et al. | 521/56 |

Primary Examiner—Morton Foelak
Attorney, Agent, or Firm—Oblon, Spivak, McClelland, Maier & Neustadt

[57] ABSTRACT

Foamed particles of a propylene resin are described which comprises, as a base resin, a random copolymer of propylene and 1-butene, said random copolymer having a 1-butene content of from 3 to 12% by weight.

A foamed mold article is also described which is composed of a random copolymer of propylene and 1-butene, and having a density of from 0.015 to 0.09 g/cm$^3$.

A bumper core material for use in automobile bumpers is also discribed which is composed of a foamed mold article of a random copolymer of propylene and 1-butene, said random copolymer having a 1-butene content of from 3 to 12% by weight, said foamed mold article having a density of from 0.02 to 0.08 g/cm$^3$, a compression stress at 50% compression as measured at 20° C. of 2.5 to 10 kg/cm$^2$, and an energy absorption efficiency as measured at 20° C. of 60 to 90% the ratio ($E_{80}/E_{20}$) of the amount of the energy absorption of said foamed mold article as measured at 80° C. ($E_{80}$) to the amount of the energy absorption of said foamed mold article as measured at 20° C. ($E_{20}$) being 0.5 to 0.9.

1 Claim, 1 Drawing Sheet

PROPYLENE RESIN FOAMED PARTICLES AND FOAMED MOLD ARTICLE

FIELD OF THE INVENTION

This invention relates to foamed particles of a propylene copolymer resin and a foamed mold article. The foamed mold article obtained by filling the foamed particles of the present invention into the cavity of a mold having a steam holes and then heating the foamed particles with steam to melt-adhere the foamed particles to each other is excellent in heat resistance, impact resistance, and strength, particularly mechanical strength, due to the strong adhesion among the foamed particles. The foamed mold article if therefore useful as a lagging material for hot-spring pipings or solar water heaters, a heat-insulating material for use in walls, floors or the like, and a cushioning material such as packaging fitment for refrigerators or TV sets and a core material for automobile bumpers.

BACKGROUND OF THE INVENTION

Polystyrene foamed mold articles are being used as a heat-insulating material, a packaging fitment and cushioning material in various fields. However, the polystyrene foamed mold article has disadvantages that its recovery of compression strain is low, and that it is poor in heat resistance, which is 70 to 80° C. at the highest, and in oil resistance and impact resistance.

In an attempt to eliminate these disadvantages, there have been proposed foamed particles of propylene resins [see, JP-B-49-2183, JP-A-57-90027, JP-A-57-195131, JP-A-58-1732, JP-A-58-23834, JP-A-58-25334, JP- A-58-33435, JP-A-58-55231, JP-A-58-76229, JP-A-58-76231, JP-A-58-76232, JP-A-58-76233, JP-A-58-76234, JP-A-5887027 and JP-A-62-151325 (The terms "JP-A" and "JP-B" as used herein mean an "unexamined published Japanese patent application" and an "examined Japanese patent publication",rrespectively)].

Of such foamed particles of propylene resins, the foamed particles composed of a propylene homopolymer as a base resin should be molded, with high-pressure steam, i.e., high-temperature steam, applied thereto so as to complete the melt-adhesion of the foamed particles. Thus, there has been proposed preliminarily foamed particles .prepared by the use of an ethylenepropylene random copolymer, as a base resin, having an ethylene content of from 1 to 20% by weight (see, JP-B59-23731).

The above-mentioned preliminarily foamed particles are advantageous in that they can be molded at a lower steam pressure than that for foamed particles composed of such a base resin as a propylene homopolymer or an ethylene-propylene block copolymer.

On the other hand, in the field of automobile bumpers, the conventional metallic bumpers are being replaced by plastic bumpers, particularly those composed of a core material of foamed resin and a surface material of non-foamed resin, in order to decrease the weight of an automobile. As raw resins for such a foamed bumper core material, there have been employed a polyurethane foam, polystyrene, crosslinked polyethylene and an ethylene-propylene random copolymer [see, "Foam Times" No. 842, published on July 25, 1981, JP-A-U-55-163254 The term "JP-A-U" as used herein means an "unexamined published Japanese utility model application"), U.S. Pat. No. 4,350,378, JP-A-58-221745, JP-A-60-189660, and U.S. Pat. Nos. 4,504,534 and 4,600,636].

A bumper core material composed of a foamed mold article whose base resin is an ethylene-propylene-random copolymer having an ethylene content of from 1 to 12% by weight and which has a density of from 0.03 to 0.065 g/cm$^3$ is superior in light weight properties to polyurethane foams, superior in dimensional recovery and heat resistance to polystyrene foamed mold articles, and superior in heat resistance and strength to crosslinked polyethylene foamed mold articles. For this reason, there has recently been a growing demand for this foamed mold article as a bumper core material.

Foamed particles of a propylene resin is produced by the process which comprises dispersing propylene resin particles into water in a closed vessel, feeding a volatile organic blowing agent into the closed vessel, heating the dispersion to a temperature above the softening point of the propylene resin particles while the pressure within the closed vessel is being kept at the vapor pressure of the blowing agent or a higher pressure, maintaining that temperature and pressure for a certain period of time, and then opening a discharge port provided in the closed vessel below the water level to release, together with the water, the propylene resin particles impregnated with the volatile blowing agent into an atmosphere having a lower pressure than that within the vessel (refer to the Japanese Patent Publications as mentioned hereinbefore).

In this process for preparing propylene resin foamed particles,. an ethylene-propylene random copolymer can also be advantageously used as a raw resin. That is, in the case where foamed particles having a certain expansion rate are to be produced from an ethylene-propylene random copolymer having a lower melting point, a propylene homopolymer and an ethylene-propylene block copolymer, separately, with the filling ratio (the ratio of the total volume of the contents such as the water, resin, etc. to be used for the reaction to the capacity of the closed vessel) kept constant over the three raw resins, the heating temperature for the ethylene-propylene random copolymer having a lower melting point can be low and, hence, the inner pressure of the closed vessel can also be low as compared with those for the other two polymers, so that a closed vessel designed to have a lower pressure resistance can be employed for the ethylene-propyelne random copolymer.

Because of its low melting point, an ethylene-propylene random copolymer having a higher ethylene content is preferred, from the viewpoint of easy foaming and molding, to an ethylene-propylene random copolymer with a lower ethylene content.

However, in order to improve the compressive strength of a foamed mold article (such as, for example, a bumper core material as disclosed in the aforementioned JP-A-58-221745) obtained by heating and melt-adhering, in a mold, foamed particles comprising an ethylene-propylene random copolymer as a base resin, the expansion rate of the intended foamed mold article should be lowered as described in the aforementioned JP-A- 60-189660, or an ethylene-propylene random copolymer having a low ethylene content should be employed as a base resin.

If such a foamed mold article is for use as a bumper core material, it is not preferable to lower the expansion rate, i.e., to increase the density, of the mold article (bumper core material) from the viewpoint of automobile design, because it results in an increased weight of the bumper core material.

Thus, in order to meet the need for lighter-weight automobile, a foamed mold article having a lower density is preferred over others if the former has the same strength as those of the latter.

On the other hand, if an ethylene-propylene random copolymer having a low ethylene content is employed as a base resin, the pressure resistance of the closed vessel to be used for preparing foamed particles from the base resin should be increased and the operating temperature also increased, as mentioned before, so as to cope with the high melting point of the base resin. Further, where the thus-prepared foamed particles are subjected to molding, the molding machine should be modified to increase its mold clamping force and there are other economical disadvantages related to equipment and service.

Moreover, the sizes of the cells of the foamed particles obtained from such ethylene-propylene random copolymer are so small that the mutual melt-adhesion of the foamed particles at the time of molding is not good.

JP-A-60-110734 disclosed preliminarily foamed particles of a propylene-1-butene random copolymer having a 1-butene content of from 15 to 40 mol % (19 to 47% by weight) and a heat of crystallization of from 5 to 15 cal/g.

The above-mentioned preliminarily foamed particles are molded into a foamed mold article by a process which comprises imparting an elevated pressure to the inside of the preliminarily foamed particles with pressurized air, filling the resulting particles into a cavity of a mold, and applying heat to the particles in the cavity of a mold to take place secondary foaming. The purpose of the use of the propylene-1-butene random copolymer in this process is to effect the heating at a lower temperature, and there is no description therein teaching or suggesting a method of improving the mechanical strength of the foamed mold article.

Since this propylene-1-butene random copolymer having a 1-butene content of from 15 to 40 mol % has a low crystallinity as apparent from its heat of crystallization as low as 5 to 15 cal/g, the molding can be effected at a lower temperature. However, the thus-obtained foamed mold article shows little improvement in compressive strength.

SUMMARY OF THE INVENTION

It is, therefore, an object of the present invention to provide foamed particles which can be produced by means of conventional equipments at a relatively low temperature or pressure, and which can be molded, by the application of heat for melt-adhesion by means of conventional equipments at a relatively low temperature or pressure, into a foamed mold article having an excellent compressive strength.

Another object of this invention is to provide a bumper core material for use in automobile bumpers, which is excellent in strength, energy-absorbing properties and heat resistance.

The foregoing and other objects, features and advantages of the present invention will be apparent to those skilled in the art from the following detailed description and appended claims taken in connection with the accompanying drawing in which:

DETAILED DESCRIPTION OF THE INVENTION

Figure 1:
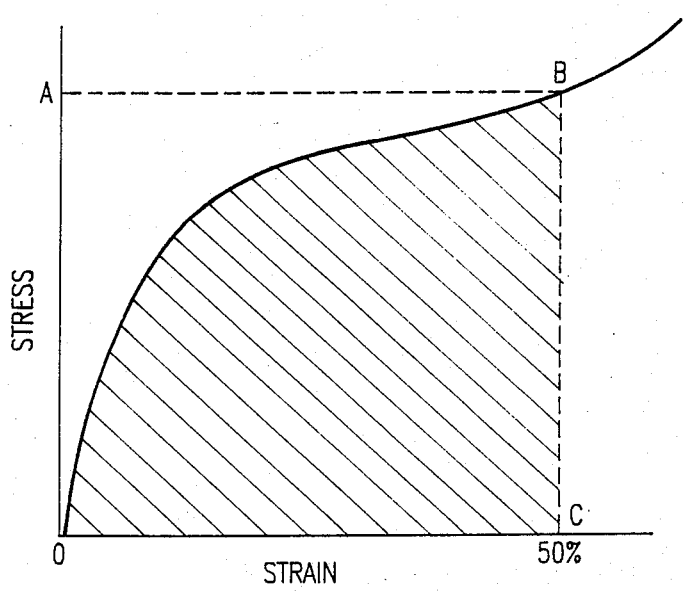
FIG. 1 is a graph showing a stress-stain curve of a bumper core material of the present invention.

According to the present invention, the temperature for the foaming of a raw resin and the steam pressure (temperature) for the molding of foamed particles can be lowered and also the compressive strength of the resulting foamed mold article can be improved, by the use of a propylene-1-butene random copolymer, as a base resin, which has a 1-butene content of from 3 to 12% by weight, preferably from 4 to 10% by weight and, hence, has a high crystallinity.

In one aspect of the present invention, there is provided foamed particles of a propylene resin which comprises, as a base resin, a random copolymer of propylene and 1-butene, said random copolymer having a 1-butene content of from 3 to 12% by weight.

α-Olefin copolymerizable with propylene include 1-butene, ethylene, 1-hexene, 1-pentene and many others. However, it is presumed that 1-butene assumes a similar crystalline state in the copolymer as that of propylene and, hence, such crystalline states are highly stable.

This propylene-1-butene random copolymer has a heat of crystallization of from 17 to 29 cal/g, preferably from 17 to 25 cal/g. The foamed particles prepared from this random copolymer usually has a bulk density of from 0.015 to 0.090 g/cm$^3$, preferably from 0.030 to 0.070 g/cm$^3$.

Further, as a core material for automobile bumpers which realizes the above-mentioned object, there is provided a bumper core material for use in automobile bumpers which is composed of a foamed mold article of a random copolymer of propylene and 1-butene, said random copolymer having a 1-butene content of from 3 to 12% by weight, said foamed mold article having a density of from 0.02 to 0.08 g/cm$^3$, a compression stress at 50% compression as measured at 20° C. of 2.5 to 10 kg/cm$^2$, and an energy absorption efficiency as measured at 20° C. of 60 to 90%, the ratio ($E_{80}/E_{20}$) of the energy absorption of said foamed mold article as measured at 80° C. ($E_{80}$) to the amount of the energy absorption of said foamed mold article as measured at 20° C. ($E_{20}$) being 0.5 to 0.9.

The bumper core material of the present invention is a mold article obtained by molding foamed particles of a propylene resin which comprises propylene as the principal constituent and 1-butene, with the 1-butene content being 3 to 12% by weight. As the propylene resin for use in making the bumper core material, there may be employed a random copolymer of 1-butene and propylene; a random terpolymer of 1-butene, ethylene and propylene, with the 1-butene content and ethylene content being 3 to 12% by weight and 0.5 to 5% by weight, respectively; a terpolymer of 1-butene, 4-methylpentene-1 and propylene, with the 1-butene content and 4-methylpentene-1 content being 3 to 12% by weight and 0.5 to 5% by weight, respectively; a random terpolymer of 1-butene, 1-hexene and propylene; a quadripolymer of 1-butene, propylene, ethylene and 4-methylpentene-1 or 1-hexene; and the like.

The propylene-1-butene random copolymer for use in making the bumper core material preferably has a crystallinity of 40 to 90% and a heat of crystallization of from 17 to 28 cal/g.

The 1-butene contents of these propylene-1-butene random copolymers were determined by infrared spectrophotometry using samples prepared by applying a pressure of 2 kg/cm$^2$G on the copolymer particles at 190° C. for 1 minute by means of a hot press to obtain 0.5 mm-thick sheets, and then leaving the sheets for a day at 20° C.

The heat of crystallization of the copolymer was determined by means of a differential scanning calorimeter (DSC). That is, using the DSC, a sample weighing 3 to 8 mg was molten at 240° C., and then cooled to 30° C. at a rate of 10° C./min. From the area of the crystallization peak on the resulting DSC chart, the heat energy released from the copolymer when the molten copolymer crystallized was calculated.

The 1-butene content of the copolymer is from 3 to 12% by weight, preferably from 4 to 10% by weight. A copolymer having a 1-butene content below 3% by weight is disadvantageous in that the preparation of foamed particles from such a copolymer and the melt-adhesion of the foamed particles by heat should be effected at a too high temperature or pressure, because suc a copolymer has a high melting point and the foamed particles prepared therefrom have very small cells. A copolymer having a 1-butene content above 12% by weight is not good because it gives a foamed mold article having poor compressive strength and heat resistance.

According to need, other polyolefin resins can be blended with the propylene-1-butene random copolymer in an amount not exceeding 50% by weight based on the total amount. For example, there may be added a propylene homopolymer, an ethylene-propylene random copolymer, an ethylene-propylene block copolymer, an ethylene-propylene rubber, an ethylene-propylene-1-butene random copolymer, a high-pressure low-density polyethylene, a straight-chain low-density polyethylene, medium- and high-density polyethylenes, an ethylene-vinyl acetate copolymer, an ethylene-methyl acrylate copolymer, an ethylene-ethyl acrylate copolymer, an ethylene-acrylic acid copolymer, etc.

Further, the propylene resin may contain an inorganic filler such as zeolite, silica, talc or the like, a pigment, a heat stabilizer, a dye, a lubricant and an antistatic agent. The content of such fillers and additives in the propylene resin should be 5% by weight or less, preferably 2% by weight or less, based on the amount of the resin in order to attain good melt-adhesion when the foamed particles to be obtained from the propylene resin are molded by steam-heating the foamed particles to melt-adhere to each other.

The weight of each particle of the propylene-1-butene random copolymer is from 0.01 to 20 mg, preferably from 0.1 to 10 mg. The granulation can be done any of the strand-cutting method, the underwater cutting method, the sheet-cutting method, the freeze-pulverization method, the melt spraying method and the like. A suitable method may be selected taking into consideration production efficiency, economical efficiency, moldability and quality. Regranulation may also be possible.

Foamed particles of the propylene-1-butene random copolymer may be according to the methods as described in the aforementioned Japanese Patent Publications.

For example, foamed particles are produced by a process which comprises dispersing particles of a propylene-1-butene random copolymer in water in a closed vessel, feeding a volatile blowing agent into the closed vessel, heating the dispersion to a temperature not lower than the softening point of the resin particles but not exceeding the temperature 20° C. higher than the melting point of the resin particles, and then opening a discharge port provided in the closed vessel below the water level to release the aqueous dispersion containing the resin particles impregnated with the blowing agent into an atmosphere having a lower pressure than that within the closed vessel (e.g., the atmosphere). In this process, it is preferably that the release of the dispersion be facilitated by heightening the pressure within the closed vessel by introducing air or nitrogen gas.

Examples of the volatile blowing agent to be used include organic compounds having boiling points not exceeding 80° C., such as aliphatic hydrocarbons, e.g., propane, butane, pentane, hexane, heptane, etc.; and halogenated hydrocarbons, e.g., trichlorofluoromethane, dichlorodifluoromethane, dichlorotetrafluoromethane, methyl chloride, ethyl chloride, methylene chloride, etc. They may be used either alone or in combination of two or more thereof.

The amount of the volatile blowing agent is varied depending upon the kind thereof and the desired bluk density of the intended resin foamed particles. However, it is usually in the range of from 10 to 50 parts by weight per 100 parts by weight of the resin particles.

Examples of the dispersing agent which can be used for dispersing the resin particles include inorganic suspending agents such as aluminum oxide, titanium oxide, calcium carbonate, basic magnesium carbonate, calcium tertiary phosphate, calcium pyro-phosphate, etc.; water-soluble polymeric protective colloids such as polyvinyl alcohol, carboxymethyl cellulose, N-polyvinylpyrrolidone, etc.; and anionic surface active agents such as sodium dodecylbenzene-sulfonate, sodium alkanesulfonates, sodium. alkylsulfates, sodium olefin sulfates, acylmethyltaurines, sodium dialkylsulfosuccinates, etc. Of these, particularly preferred is a combined use of calcium tertiary phosphate having a particle size of 0.01 to 0.8 μm as an inorganic suspending agent and sodium dodecylbenzenesulfonate as an auxiliary suspending agent. Such calcium tertiary phosphate fine particles can be prepared by reacting from 0.60 to 0.67 mole of phosphoric acid per mole of calcium hydroxide in water.

The amount of water to be used as a dispersing medium may be in the range of from 150 to 1,000 parts by weight, preferably from 200 to 500 parts by weight, per 100 parts by weight of the resin particles. If the amount of water is less than 150 parts by weight, blocking of the resin particles is apt to occur during the application of heat and pressure. If it exceeds 1,000 parts by weight, the productivity of foamed particles is reduced and, hence, not economically efficient.

Resin foamed particles according to the present invention can be prepared as follows. The propylene-1-butene random copolymer resin particles are dispersed in water by a dispersing agent in a closed vessel, and a gaseous or liquid blowing agent is fed to the aqueous dispersion. The dispersion in the closed vessel is then heated to a temperature not lower than the softening point of the resin but not higher than the temperature 20° C. higher than the melting point. The pressure within the vessel rises upon this heating, whereby the blowing agent is impregnated into the copolymer resin particles. Thereafter, the copolymer resin particles are released together with the water from the closed vessel through a discharge port, e.g., a slit or a nozzle, provided in the lower portion of the closed vessel into a zone kept at a lower pressure than that in the closed vessel, generally at atmospheric pressure. Thus, propylene-1-butene random copolymer foamed particles having a bluk density of from 8 to 100 kg/m³ can be obtained.

In the above process, before or after the addition of the blowing agent into the closed vessel, an inorganic gas, such as nitrogen, helium, air, etc., is introduced into the closed vessel to apply pressure. The introduction of the inorganic gas may be effected either before or after the heating of the dispersion.

This introduction of an inorganic gas, such as air, nitrogen, argon, etc., into the closed vessel serves to facilitate impregnation of a blowing agent into the resin particles and to produce propylene-1-butene random copolymer foamed particles having a low bluk density.

A suitable heating temperature for the dispersion can be decided as follows. That is, the propylene-1-butene random copolymer resin particles are assayed for a peak of crystal fusion temperature (so-called melting point) by means of a differential scanning calorimeter. Then, the heating temperature is selected from the range between the lower limit set at the temperature about 20° C. lower than the peak temperature and the upper limit set at the temperature about 20° C. higher than the peak temperature, and is preferably 3° to 15° C. lower than the peak temperature.

The time for the heating of the dispersion in a closed vessel is varied depending upon the pressure applied on the dispersion, the temperature at which the dispersion is being heated and a desired expansion rate. However, it is usually from 30 minutes to 12 hours, and preferably from 1 to 3 hours.

The resulting foamed particles released into the atmosphere are dried, or .aged, in a chamber at 30 to 65° C. to remove the water which is adhering to the surfaces of the foamed particles. The dried foamed particles are then molded into a cushioning material, e.g., a bumper core material, a container, etc.

As a molding method, or a bead-molding method, to be applied to the foamed particles, there may be employed various known methods, examples of which are as follows.

(1) A compression molding method which comprises filling the propylene-1-butene random copolymer foamed particles into a cavity of a mold, compressing the foamed particles to reduce their volume by 15 to 50%, introducing steam under a pressure of 1 to 5 kg/cm²G to melt-adhere the foamed particles to each other, and then cooling the mold to obtain a final product (West German Patent Application (OLS) No. 2107683).

(2) A method which comprises previously impregnating the foamed particles with a volatile blowing agent to impart secondly foamability to them, filling the foamed particles into a cavity of a mold, and heating them with steam, whereby secondary foaming takes place and the particles are melt-adhered to each other, to obtain a final product.

(3) A method which comprises putting the foamed particles in a closed chamber, introducing an inorganic gas, e.g., air, nitrogen, etc., under pressure into the chamber to elevate the pressure in the cells of the foamed particles and thus impart secondary foamability, filling into a cavity of a mold the prefoamed particles having secondary foamability, and heating them with -steam, whereby sedonary foaming takes place and the particles are melt-adhered to each other, to obtain a final product (a so-called press aging method; JP-B-59-23731 and JP-B-59-43492).

(4) A method of producing a foamed mold article by filling the foamed particles into a cavity of a mold and heating them with steam to melt-adhere the foamed particles to each other, which method comprises filling the foamed particles into a cavity of a mold whose inner pressure has been heightened to 1.0 to 6.0 kg/cm²G by introducing a pressurized gas, said filling of the foamed particles being effected portion-wise successively while compressing the foamed particles by a pressurized gas having a pressure 0.5 kg/cm²G or more higher than the pressure in the cavity of the mold and while maintaining the pressure in the cavity of the mold within the range mentioned above, subsequently, after completion of the filling, lowering the pressure in the cavity of the mold to atmospheric pressure, and then heating the foamed particles with steam ,to melt-adhere the foamed particles to each other, wherein the compression rate of the foamed particles represented by the following formula:

$$\text{Compression rate (\%)} = \frac{(W/\sigma - V)}{W/\sigma} \times 100$$

wherein W and V represent the weight (g) and the volume (l) of the intended mold article, respectively, and σ represents the bulk density (g/l) of the foamed particles as measured in the atmosphere, is controlled so as to be in the range of fro 40 to 70%, thereby to obtain a final product (JP-A-62-151325).

(5) A method of producing a foamed mold article from propylene-1-butene random copolymer particles by filling a cavity of a mold with foamed particles of a propylene-1-butene random copolymer, and heating them with steam to melt-adhere the foamed particles to each other, which method comprises filling a cavity of a mold whose inner pressure has been heightened to 0.5 to 5.0 kg/cm²G by introducing a pressurized gas with the foamed particles which have been obtained by treating foamed particles with a pressurized gas having a pressure 0.5 kg/cm²G or more higher than the pressure in the cavity of the mold for not less than 1 hour to impart an elevated gas pressure to the inside of the particles, said filling of the foamed particles being effected portion-wise successively by the use of a pressurized gas having a pressure 0.5 kg/cm²G or more higher than the pressure in the cavity of the mold while maintaining the pressure in the cavity of the mold within the range mentioned above, subsequently, after completion of the filling, lowering the pressure in the cavity of the mold to atmospheric pressure, and then heating the foamed particles with steam to melt-adhere the foamed particles to each other, wherein the compression rate of the foamed particles represented by the following formula:

$$\text{Compression rate (\%)} = \frac{(W/\sigma - V)}{W/\sigma} \times 100$$

wherein W and V represent the weight (g) and the volume (l) of the intended mold article, respectively, and σ represents the bulk density (g/l) of the foamed particles as measured in the atmosphere, is controlled so as to be below 40% (excluding 0%), thereby to obtain a final product.

The thus-obtained foamed mold articles of a propylene-1-butene random copolymer, e.g., a bumper core material, show excellent melt-adhesion among the foamed particles and high mechanical strength.

The bumper core material for use in automobile bumpers according to the present invention has a density of from 0.02 to 0.08 g/cm$^3$, preferably from 0.030 to 0.075 g/cm$^3$. If the density is below 0.02 g/cm$^3$, the energy-absorbing properties are poor, while if it exceeds 0.08 g/cm$^3$, such a bumper core material has no merit in light weight as compared with other materials such as that composed of a propylene-ethylene copolymer.

In addition to low densities which lead to lighter weights of automobiles, the bumper core materials are required to have:

(1) high strength so as to reduce their thicknesses;
(2) energy absorption efficiencies of 60% or more as measured at room temperature;
(3) sufficient energy-absorbing properties in the high-temperature range;
(4) excellent chemical resistance; etc.

The bumper core material of the present invention has the following specific properties as derived from the stress-strain curve shown in FIG. 1, which is obtained by cutting out a test piece having a length of 80 mm, a width of 80 mm and a thickness of 50 mm, and compressing it at a speed of 20 mm/min:

(i) The compression stress at 50% compression (Point A) as measured at 20° C. is as high as 2.5 kg/cm$^2$ or more;
(ii) The energy absorption efficiency (area of OAB/area of OABC) is 60% or more; and
(iii) The ratio ($E_{80}/_{20}$) of the energy absorption at 80° C. ($E_{80}$) to that at 20° C. ($E_{20}$) is 0.5 or more.

Hence, the bumper core material of the present invention has a higher strength that that of the conventional bumper core material composed of a foamed ethylene-propylene random copolymer. The bumper core material of the present invention therefore has advantages that (a) the thickness of the bumper core material can be reduced under a restriction that bumper core materials should have the same density, and that (b) the bumper core material having a lower density can be employed under a restriction that bumper core materials should have the same thickness, thereby enabling bumper core materials to be light-weight. Further, the bumper core material of the present invention shows sufficient energy absorbing properties even at high temperatures.

The present invention will be illustrated in more detail with reference to the following Examples, which should not be construed to be limiting the scope of the invention. In the Examples and Comparative Examples, all parts and percentages are by weight.

EXAMPLE 1

Foamed particles were prepared using propylene-1-butene random copolymer particles having a 1-butene content of 6.0% by weight, a melt flow rate (MFR) as measured at 230° C. of 8.5 g/10 min, a heat of crystallization of 19.6 cal/g and an average particle weight of about 1 mg.

That is, into an autoclave were introduced 250 parts of water, 100 parts of the above-mentioned propylene-1-butene random copolymer particles, 1.0 part of calcium tertiary phosphate having a particle diameter of 0.3 to 0.5 μm and 0.007 part of sodium dodecylbenzenesulfonate (filling ratio: 62%). Subsequently, nitrogen gas was fed to the autoclave, with stirring, until the inner pressure of the autoclave increased to 5 kg/cm$^2$G. After the feeding of nitrogen gas was stopped, 18 parts of isobutane was fed to the autoclave. Subsequently, the resulting dispersion in the autoclave was heated to 132° C. over a period of 1 hour, and then maintained at that temperature for 45 minutes. At the end of this 45-minute heating, the inner pressure of the autoclave was 24 kg/cm$^2$G.

After that, the valve of the discharge nozzle provided at the bottom of the autoclave was opened, and the heated dispersion was jetted therethrough into the atmosphere over a period of about 2 seconds to effect foaming. The inner pressure of the autoclave was about 10 kg/cm$^2$G the moment the final portion of the dispersion was released from the autoclave. During the release, the temperature of the autoclave was maintained at 132° C.

The thus-obtained foamed particles of the propylene-1-butene random copolymer had a bulk density of 30 kg/m$^3$, a particle diameter of 3.3 mm and a foamed cell diameter of 150 μm. No blocking of the foamed particles was observed.

These foamed particles were dried by leaving them in a chamber at 40° C. for 2 days. The resulting dried foamed particles were filled into a cavity of a mold having steam holes, and then compressed to decrease their volume by 50%. Subsequently, steam under a pressure of 3 kg/cm$^2$G was introduced to the mold to melt-adhere the foamed particles to each other. The resulting melt-adhered particles therefore were cooled with water for 10 seconds, and then allowed to cool for 30 seconds. The mold was opened to obtain a foamed mold article having a density of 60 kg/m$^3$, a width of 150 mm, a length of 300 mm and a thickness of 125 mm.

The compressive strength of thus-obtained foamed mold article was measured according to the following method, and was found to be 6.3 kg/cm$^2$.

In accordance with JIS-K6767, a test piece having a density of 60 kg/m$^3$ and a size of 50 mm x 50 mm x 50 mm was compressed at a compression speed of 10 mm/min, and the load at 50% compression was measured. This measurement was made at 20° C.

EXAMPLES 2 AND 3 AND COMPARATIVE EXAMPLES 1 to 5

Using particles of each of the resin as shown in Table 1, the same procedures as in Example 1 were repeated except that the temperature of the autoclave was varied so as to obtain foamed particles having a bulk density of 30 kg/m$^3$ (accordingly, the inner pressure of the autoclave also varied) and the steam pressure was properly selected so as to melt-adhere the foamed particles to each other. Thus, foamed mold articles each having a density Of 60 kg/m$^3$ were obtained.

Each article was evaluated for heat of crystallization and compressive strength, and the results are shown in Table 1.

In Table 1, the foaming temperature indicates the temperature of the autoclave before the heated dispersion is released from it. As mentioned above, the temperature of the autoclave was selected so as to obtain foamed particles having a bulk density of 30 kg/m$^3$, with the raw materials-introducing conditions (filling ratio) as in Example 1 kept unchanged.

Further, the molding temperature indicates the minimum steam pressure needed to obtain a foamed mold article of good quality.

TABLE 1

| | Base resin | | | | | |
|---|---|---|---|---|---|---|
| | Kind | α-olefin* content (wt. %) | Heat of crystallization (cal/g) | Foaming temperature (°C.) | Molding temperature (kg/cm²G) | Compressive strength (kg/cm²) |
| Example | | | | | | |
| 1 | Propylene-1-butene random copolymer | 6.0 | 19.7 | 131 | 3.0 | 6.2 |
| 2 | Propylene-1-butene random copolymer | 9.1 | 18.0 | 129 | 2.6 | 6.1 |
| 3 | Propylene-1-butene random copolymer | 3.5 | 21.6 | 133 | 3.3 | 6.4 |
| Comparative Example | | | | | | |
| 1 | Propylene-1-butene random copolymer | 1.0 | 24.2 | 145 | 4.3 | 6.6 |
| 2 | Propylene-1-butene random copolymer | 16.4 | 16.5 | 125 | 2.2 | 5.4 |
| 3 | Ethylene-propylene random copolymer | 3.9 | 17.3 | 129 | 3.0 | 4.3 |
| 4 | Propylene-1-hexene random copolymer | 5.1 | 21.2 | 133 | 3.2 | 4.4 |
| 5 | Propylene homopolymer | 0 | 30.1 | 160 | 4.5 | 6.8 |

*ethylene, 1-butene or 1-hexene

EXAMPLE 4

Foamed particles were prepared using propylene-1-butene random copolymer particles having a 1-butene content of 5.2% by weight, an MFR as measured at 230° C. of 9.7 g/10 min, a heat of crystallization of 22.6 cal/g and an average particle weight of about 1 mg.

That is, into an autoclave were introduced 250 parts of water, 100 parts of the above-mentioned propylene-1-butene random copolymer particles, 1.0 part of calcium pyrophosphate and 0.007 part of sodium dodecylbenzenesulfonate (filling ratio: 62%). Subsequently, nitrogen gas was fed to the autoclave, with stirring, until the inner pressure of the autoclave
the feeding of nitrogen increased to 5 kg/cm²G. After gas was stopped, 18 parts of isobutane was fed to the autoclave. Subsequently, the resulting dispersion was heated to 140° C. over a period of 1 hour, and then maintained at that temperature for 45 minutes. At the end of this 45-minute heating, the inner pressure of the autoclave was 26 kg/cm²G.

After that, the valve of the discharge nozzle provided at the bottom of the autoclave was opened, and the heated dispersion was jetted therethrough into the atmosphere over a period if about 2 seconds to effect foaming. The inner pressure of the autoclave was about 10 kg/cm²G the moment the final portion of the dispersion was released from the autoclave. During the release, the temperature of the autoclave was maintained at 140° C.

The thus-obtained foamed particles of the propylene-1-butene random copolymer had a bulk density of 30 kg/m³, a particle diameter of 3.3 mm and a foamed cell diameter of 150 μm. No blocking of the foamed particles was observed.

These foamed particles were dried by leaving them in a chamber at 40° C. for 2 days. The resulting dried foamed particles were filled into a cavity of a mold having steam holes, and then compressed to decrease their volume by 50%. Subsequently, steam under a pressure of 3.0 kg/cm²G was introduced to the mold to melt-adhere the foamed particles to each other. Then, the resulting melt-adhered particles were cooled with water for 10 seconds, and then allowed to cool for 30 seconds. The mold article was taken out of the mold, thus obtaining a bumper core material having a density of 0.062 g/cm³, a length of 1500 mm, a width of 200 mm and a thickness of 150 mm.

A test piece having a length of 80 mm, a width of 80 mm and a thickness of 50 mm was cut out of the thus-obtained bumper core material, and subjected to a compression test to obtain a stress-strain curve as measured at 20° C. and that for 80° C. From the two stress-strain curves, there were obtained the stress at 50% strain, the energy absorption efficiencies, the amounts of energy absorption, and the ratio of the amount of energy absorption at 80° C. to the amount of energy absorption at 20° C.

The results obtained are shown in Table 2.

EXAMPLES 5 to 7 AND COMPARATIVE EXAMPLES 6 to 8

Using the polypropylene resins as shown in Table 2, which were propylene-butene-1 random copolymers (BPF), propylene-ethylene random copolymers (EPF) and a propylene-ethylene block copolymer (EPB), the same procedures as in Example 4 were repeated, thereby obtaining bumper core materials. They had physical properties as shown in Table 2.

TABLE 2

| | Examples | | | | Comparative Examples | | |
|---|---|---|---|---|---|---|---|
| | 4 | 5 | 6 | 7 | 6 | 7 | 8 |
| Base resin | BPF | BPF | BPF | BPF | EPF | EPF | EPB |
| 1-Butene content (wt. %) | 5.2 | 5.2 | 8.5 | 3.6 | 0 | 0 | 0 |
| Ethylene content (wt. %) | 0 | 0 | 0 | 0 | 2.5 | 4.0 | 9.3 |
| Heat of crystallization (cal/g) | 22.6 | 22.6 | 18.4 | 22.9 | 19.5 | 17.1 | 28.1 |

TABLE 2-continued

| | Examples | | | | Comparative Examples | | |
|---|---|---|---|---|---|---|---|
| | 4 | 5 | 6 | 7 | 6 | 7 | 8 |
| Bumper core material | | | | | | | |
| Density (g/cm$^3$) | 0.062 | 0.053 | 0.072 | 0.041 | 0.060 | 0.072 | 0.069 |
| 20° C. | | | | | | | |
| Stress (kg/cm$^2$) | 7.8 | 6.0 | 7.7 | 4.5 | 5.8 | 5.6 | 5.8 |
| Energy absorption efficiency (%) | 72.3 | 70.2 | 71.5 | 70.8 | 68.4 | 69.1 | 69.9 |
| Amount of energy absorption (kg · cm/cm$^3$) | 2.82 | 2.11 | 2.75 | 1.59 | 1.98 | 1.93 | 2.03 |
| 80° C. | | | | | | | |
| Energy absorption efficiency (%) | 70.6 | 70.1 | 70.8 | 70.2 | 62.6 | 60.2 | 61.3 |
| Amount of energy absorption (kg · cm/cm$^3$) | 1.52 | 1.16 | 1.52 | 0.90 | 0.81 | 0.66 | 0.80 |
| $E_{80}/E_{20}$ | 0.539 | 0.550 | 0.553 | 0.566 | 0.409 | 0.342 | 0.394 |
| Cell structure | closed cell | closed cell | closed cell | closed cell | closed cell | closed cell | closed cell |

While the invention has been described in detail and with reference to specific embodiments thereof, it will be apparent to one skilled in the art that various changes and modifications can be made therein without departing from the spirit and scope thereof.

What is claimed is:

1. A bumper core material for use in automobile bumpers which is composed of a foamed mold article of a random copolymer of propylene and 1-butene, said random copolymer having a 1-butene content of from 3 to 12% by weight, said foamed mold article having a density of from 0.02 to 0.08 g/cm$^3$, a compression stress at 50% compression as measured at 20° C. of 2.5 to 10 kg/cm$^2$, and an energy absorption efficiency as measured at 20° C. of 60 to 90%, the ratio ($E_{80}/E_{20}$) of the amount of the energy absorption of said foamed mold article as measured at 80° C. ($E_{80}$) to the amount of the energy absorption of said foamed mold article as measured at 20° C. ($E_{20}$) being 0.5 to 0.9.

* * * * *